3,042,661
HYDROXYLATION OF ELASTOMERS
Isidor Kirshenbaum, Westfield, Clifford W. Muessig, Roselle, and Ralph M. Hill, Mountainside, N.J., assignors to Esso Research and Engineering Company, a corporation of Delaware
No Drawing. Filed Dec. 18, 1959, Ser. No. 860,319
19 Claims. (Cl. 260—83.3)

This invention relates to a novel process for introducing functionality into high molecular weight polymers by oxidation with molecular oxygen in the presence of a boric acid compound. In particular this invention relates to hydroxylating unsaturated rubbery polymers while maintaining the unsaturation in the oxidized polymers. In a preferred embodiment this invention relates to a process for introducing hydroxyl groups into copolymers of iso-olefins and multi-olefins by the air oxidation of such polymers without substantial polymer degradation as evidenced by a severe drop in molecular weight.

These low unsaturation synthetic polymers, known in the art as butyl rubber or GR-I (Government Rubber Isobutylene—see the textbook "Synthetic Rubber" by G. S. Whitby, 1954 edition by John Wiley & Sons, Inc., pages 608–609, etc.) have a relative inertness and other peculiar properties which make them behave in a unique fashion. For instance, they cure at a much slower rate, are highly air impermeable and resistant to oxygen, ozone and sunlight. The expression "butyl rubber" as employed in the specification and claims is intended to include copolymers containing about 90 to 99.5% by weight of an iso-olefin of about 4 to 7 carbon atoms, preferably isobutylene, and about 10–0.5% by weight of a conjugated multi-olefin of about 4 to 10 carbon atoms, preferably a $C_4$–$C_6$ conjugated diolefin such as isoprene, butadiene, dimethyl butadiene, piperylene, etc. Other modifications include tri- and tetra-polymers such as the isobutylene-isoprene-cyclopentadiene tripolymer and the isobutylene, isoprene, cyclopentadiene, divinyl benzene tetrapolymers as well as halogenated derivatives of the aforementioned copolymers, tripolymers, tetrapolymers, etc. The reaction product of isobutylene and isoprene is preferred.

The preferred butyl rubber, the copolymer of isobutylene and isoprene, is prepared by reacting the iso-olefin with the conjugated diolefin at relatively low temperatures; preferably from about 0° C. to about −180° C. or lower, an advantageous range being from about −40° C. to about −160° C., preferably from about −80° C. to about −120° C. The reaction is conducted in the presence of a Friedel-Crafts catalyst such as aluminum chloride, titanium tetrachloride, boron trifluoride, etc. dissolved in an alkyl halide, such as ethyl or methyl chloride, or dissolved in carbon disulfide or equivalent solvent. The resulting copolymer preferably has a Staudinger molecular weight between about 20,000 to about 100,000 or somewhat higher. This corresponds to a viscosity average molecular weight from about 150,000 to about 1,500,000 or more as determined by the intrinsic viscosity method using the P. J. Flory Correlation, "Principles of Polymer Chemistry," Paul J. Flory, 1953, Cornell University Press, Chapter 7, particularly section 4c. The preferred viscosity average molecular weight is from about 250,000 to about 1,000,000 or more and a mole percent unsaturation between about 0.5 or less than 15, advantageously between 0.5 and 5, and preferably between 0.6 and 3.0. The preparation of the various modifications of butyl rubber is well known and described in U.S. Patent 2,306,128 and elsewhere in the literature. The chlorinated copolymer of isobutylene and isoprene advantageously has a viscosity average molecular weight between about 250,000 and 2,000,000 and a mole percent unsaturation between about 0.5 to 10.0, preferably 0.6 to 3.0 and contains about 0.5 to 2.5%, advantageously about 1 to 2%, preferably 1.2 to 1.8 wt. percent combined chlorine. The preparation of chlorinated butyl rubbers is described in Patent 215,399 of the Commonwealth of Australia, particularly in Examples 1, 5, 7 and 10 thereof which are incorporated herein by reference.

Other embodiments of the invention include hydroxylation of polymers of diolefin monomers and other copolymers of multi-olefins and mono-olefins. These include natural rubber; synthetic polyisoprene prepared with the aid of lithium butyl or other lithium alkyl compounds, or with Ziegler type catalysts; rubbery or resinous polymers prepared by emulsion copolymeriaztion of butadiene-1,3 with styrene (GR-S) or acrylonitrile (GR-N) or the like, polybutadiene, e.g. cis polybutadiene-1,4 as well as cis, trans polymer.

It has now been found that oxygen can be introduced into the aforementioned polymers by oxidation with molecular oxygen in the presence of a boric acid compound without producing substantial change in the existing unsaturation of the polymer to produce polymers that are processible and which can be cured at rleatively low temperatures in the presence or absence of sulfur-liberating compounds.

The term "boric acid compound" is used herein to designate boric acid, i.e. $H_3BO_3$, and boron containing compounds which generate boric acid upon contact with water, e.g. boric oxide, i.e. $B_2O_3$; borate esters, e.g. trimethylborate, triethylborate, tributylborate, etc.; alkylboric acids, i.e. $R_2BOH$ (borinic acids) and $RB(OH)_2$ (boronic acids) wherein R is an alkyl radical preferably a $C_3$–$C_8$ alkyl radical; and the esters of boronic and borinic acids with $C_1$ to $C_4$ alcohols. For an explanation of the properties of the aforementioned boric acid compounds, see "The Chemistry of Organometallic Compounds," Rochow, Hurd & Lewis, 1957, by John Wiley & Sons, Inc., New York and London, pages 127–129.

The amount of boric acid employed in this process may vary somewhat, depending upon the feedstock and the end product desired. In general, the amount of boric acid employed should be in excess of the amount that would be stoichiometrically equivalent to the number of hydroxyl groups to be introduced. When using the other boron compounds disclosed herein, a chemically equivalent amount is used. It should be understood that 1 mole of $H_3BO_3$, a tribasic acid, is considered as constituting three chemical equivalents. The same is true of the borate esters hereinbefore mentioned. Broadly speaking, the present invention gives useful results when employing concentrations of $H_3BO_3$ which fall in the range of about 0.2–25, preferably 3 to 10, percent by weight of $H_3BO_3$ based on the weight of polymer feedstock. The use of the higher portion of this range is particularly of interest when comparatively large quantities of inert diluent are employed.

According to one embodiment of this invention butyl rubber is dissolved in a suitable solvent such as benzene and contacted with molecular oxygen in the presence of $H_3BO_3$. The polymer is oxidized at a temperature in the range of 100° to 250° C., preferably between 150° and 185° C. The oxidation may be carried out at pressures ranging from about atmospheric or below to 200 atmospheres or higher, preferably about 1 to 10 atmospheres. The oxidation may be continued until the desired amount of oxygen is introduced into the polymer. However, for most purposes the oxidation should be terminated when the polymer contains between about 0.1 and 15 weight percent oxygen, preferably 0.5 to 3 wt. percent oxygen. With butyl rubber it is preferred to terminate the oxidation when the polymer contains about 0.5 to 1.0 weight percent oxygen. Higher amounts of oxygen may be introduced but this is often accompanied by undesirable side reactions such as degradation. The time required for introducing such amounts of oxygen into the polymer will, of course, vary with the degree of dilution of the polymer in solution, the percentage of oxygen in the oxidizing gas and the conditions of reaction, i.e. temperature and pressure, etc. The oxygen intake by the polymer or polymer solution may be followed by an $O_2$ analysis of the exit gas. The use of an oxidation catalyst is optional. It is preferred in some embodiments to use oxidation catalysts which include compounds of cobalt, manganese, and similar metals. One embodiment involves the use of bromide catalysts such as ammonium bromide, HBr, $MnBr_2$, isopropyl bromide, etc. Although less desirable the corresponding chlorides may be used in place of or in conjunction with the bromides. Bromide concentration of 0.1–10 wt. percent (calculated as ammonium bromide and based upon the polymer feedstock) may be used, although preferred concentrations when using bromide additions are 0.5–2 wt. percent. With some feedstocks there may be advantages of introducing small amounts of oxidation initiators such as peroxides, hydroperoxides, ketones, such as methyl ethyl ketone, etc.

The solvent or diluent should preferably be chemically inert to the oxidation at the temperatures of reaction and below. Suitable organic solvents for use in this process include benzene, chlorobenzene, bromobenzene, dichlorobenzene, etc. Other solvents which are inert to oxidation at the conditions of reaction and do not react with or catalyze reactions between or within the reactants and products may also be used.

The concentration of the butyl rubber or other polymer in the solvent will depend upon the type of reactor, molecular weight of the polymer, etc. In general, the concentration of a butyl rubber having a viscosity average molecular weight of about 200,000 to about 1,000,000 or more, if the solvent is a substantially inert hydrocarbon, will be between 1 and 30% by weight, preferably about 5 to 20%. Oxygen may be introduced into the solution of polymer as air, undiluted molecular oxygen or preferably as air diluted with an inert gas. If either undiluted oxygen or a mixture wherein the mole percentage of oxygen is high is employed as the oxidant the need for diluting the solution of polymer as hereinbefore set forth is more pronounced. In some embodiments of the invention it is advantageous to employ a mixture of oxygen and an inert gas wherein the mole percentage of oxygen is lower than the percentage of oxygen in air. In general, it is preferred to use a gas mixture containing 3–6 vol. percent oxygen and correspondingly 97–94 vol. percent of an inert gas such as nitrogen.

Prior to oxidizing the polymer, it may be desirable to extract or otherwise remove contaminants which tend to interfere with the oxidation reaction. For instance, it may be desirable to extract any antioxidant or low molecular weight polymer fractions before the oxidation is begun, since removal of materials such as antioxidants from the main polymer tends to reduce the induction period. Qualitative evaluations of the oxidized product show it contains a substantial number of hydroxyl groups.

The oxidized butyl rubber may be compounded with various carbon blacks, such as the thermal, channel, and furnace blacks, silicious substances, such as clay, silicone oxides, and other pigments, such as titanium dioxide and zinc oxide, and heated to between about 130° and 200° C. in the presence or absence of about 0.1 to 2 parts by weight of a promoter per 100 parts by weight of butyl rubber. Among the promoters which have been successfully used in this manner are nitroso aromatic compounds, such as meta and para-dinitroso benzene, as well as various quinone dioximes, such as para-quinone dioxime. For example, 100 parts by weight of the oxygenated butyl rubber may be compounded with between 30 to 60 parts by weight of a carbon black and heated to a temperature of about 140° to 160° C. for from 5 to 20 minutes in a Banbury mixer or on a hot mill. The heat treatment results in a bonding between the modified rubber and the filler.

One of the important properties of the oxygenated butyl rubber is that it may be vulcanized either conventionally in the presence of a sulfur-liberating curing agent such as sulfur, tellurium diethyl dithiocarbamate, selenium diethyl dithiocarbamate, benzothiazyl disulfide, tetramethylthiuram disulfide, etc.; or it may be vulcanized in a non-sulfur cure. In the absence of sulfur, the vulcanization may be carried out at temperatures as low as 0° C. and as high as 200° C. by employing polyfunctional compounds that will react with the hydroxyl groups attached to the modified butyl rubber. Among the polyfunctional compounds which will vulcanize the oxygenated butyl rubber are organic compounds such as polyamines, e.g., trimethylene diamine; polyamides, polyisocyanates, such as diphenylmethane 4,4'-diisocyanate or hexamethylene diisocyanate; or polybasic acids, such as adipic or phthalic acid. In most instances, between about 0.5 and 10 parts by weight of the polyfunctional vulcanizing compound is compounded with 100 parts by weight of the modified butyl rubber and the compounded rubber is allowed to cure over a period of from several hours to several days at room temperature or from a few seconds up to several hours at 20° to 50° C. One also has the option of curing oxygenated butyl rubber either in solution, e.g., dissolved in hexane, in a latex or in a solid form. The ability to cure at low temperatures in either a liquid or solid form permits many versatile uses of the modified butyl rubber. For instance, it is highly adaptable to coating fabrics where it is generally undesirable to use vulcanization temperatures of higher than about 50° C. or it can be used as an adhesive or lamina.

Because of the numerous active groups located on the oxygenated butyl rubber, it can readily be blended. This is a distinct advantage over conventional butyl rubber.

In one embodiment, butyl rubber and a high unsaturation polymer, say, natural rubber, may be dissolved in a common solvent and oxidized together in the manner already described. Likewise mixtures of other polymers hereinbefore mentioned may be co-oxidized and if desired co-vulcanized. The oxidized polymers may be dehydrated to increase unsaturation to give a faster curing polymer when using conventional curing agents. The treated polymers are also more susceptible to graft polymerization reactions.

In addition to the vulcanizing agents, other conventional ingredients may be compounded into the rubber. To be specific, the modified butyl rubber may be compounded with anti-oxidants, paraffinic or naphthenic oils, pigments, fillers, light absorbing substances, and resins. All of the foregoing may be added in conventional amounts.

The oxidation of polymers of this type in the presence of boric acid (or other boron compounds hereinbefore disclosed) usually introduces the oxygen into the polymer in the form of a borate ester of the alcohol. The increased selectivity to be observed may at first be thought to be introducing an OH group into the polymer molecule and then immediately esterifying to avoid further reaction. This simple explanation is not satisfactory from the fact that the use of acetic acid or phosphoric acid in place of boric acid does not result in the selective process described in the invention.

While the following examples serve to illustrate the invention, they are not to be construed as limitations thereof.

*Example 1*

A rubbery isoprene-isobutylene copolymer (commercially available Enjay Butyl 325) having a mole percent unsaturation of about 3% and an intrinsic viscosity of 1.21 is oxidized in the following manner: 150 grams of the butyl rubber were dissolved in bromobenzene to form a 10 wt. percent solution. To this solution is added 10 grams of $H_3BO_3$ and 1.5 grams of anhydrous cobalt bromide. Thus the $H_3BO_3$ concentration is about 7 wt. percent based on the butyl rubber. Air is bubbled through the reaction solution for 3 hours while the solution is maintained at an average temperature of 150° C. The reaction is carried out at atmospheric pressure. After cooling, the solution is filtered, washed with water and the modified butyl rubber is precipitated by addition of acetone. The amount of acetone used is in excess of the amount needed for maximum precipitation. The polymer is dried in vacuum at 50°–60° C. for about 12 hours. Analysis showed the product to contain 0.9 to 1.0 wt. percent oxygen. The iodine number is 13.2 cg./gm., substantially the same as the 15 cg./gm. iodine number of the starting material. Only a very small amount of polymer degradation is noted.

An aliquot of the oxidized butyl is redissolved in n-hexane to make a 10 wt. percent solution to which is added hexamethylene diisocyanate. The solution thickened appreciably and the increased viscosity is evidence of cross-linking and the introduction of OH groups into the polymer during oxidation.

For comparison 150 grams of butyl rubber of the same composition as that employed in the first oxidation run of this example is oxidized as before except for the single difference that the $H_3BO_3$ component is left out of the reaction mixture. Analysis of the product shows only 0.5 wt. percent oxygen in the oxidized polymer but there is an undesirably excessive degradation as evidenced by a drop in the intrinsic viscosity from 1.21 to 0.88. An attempt is made to cross-link the polymer by redissolving an aliquot thereof in n-hexane to make a 10 wt. percent solution and adding hexamethylene diisocyanate exactly as before. No appreciable increase in viscosity is noted indicating little, if any, cross-linking and consequently that little, if any, of the oxygen is introduced as hydroxyl groups during the oxidation reaction.

*Example 2*

The first oxidation run of Example 1, i.e. with $H_3BO_3$ present, is repeated except for the single difference that in lieu of air there is employed an oxygen-nitrogen mixture containing about 4–6 volume percent oxygen and correspondingly 94–96 volume percent nitrogen. Hydroxyl groups are again introduced and the polymer degradation is below the small amount found when air is used in the presence of $H_3BO_3$ and insignificant compared to that found when a boric acid compound is not employed.

*Example 3*

The first oxidation run of Example 1, i.e., with $H_3BO_3$ present in the reaction mixture, is repeated except for the single difference that in lieu of $H_3BO_3$ a chemically equivalent amount of trimethyl borate is employed and superatmospheric pressures are employed. Hydroxyl groups are again introduced and the intrinsic viscosity of the oxidized polymer is not appreciably decreased.

*Example 4*

For comparison the first oxidation run of Example 1 is repeated except that the amount of $H_3BO_3$ present is varied. To compare with the 7 wt. percent based on butyl rubber used in Example 1 runs are made with 1 wt. percent, 3 wt. percent, 5 wt. percent and 15 wt. percent. All runs show improvement in preventing polymer degradation over the second run in Example 1 wherein no $H_3BO_3$ or other boric acid compound was employed. Analysis of the products show OH groups introduced. Runs with 3, 5 and 15 wt. percent show a greater improvement over the second run in Example 1 than the run with 1 wt. percent.

*Example 5*

The first oxidation run of Example 1 is repeated except that the polymer employed is a chlorinated butyl rubber prepared in the following manner.

A copolymer containing about 97% isobutylene and about 3% isoprene is first prepared as follows: About 94 parts by weight of isobutylene and about 6 parts by weight of isoprene are mixed and the resulting mixture dissolved in liquid methyl chloride. To this admixture is added a solution of aluminum chloride dissolved in liquid methyl chloride in sufficient quantities to correspond to about 0.5 part by weight of $AlCl_3$ per 100 parts by weight of reactants. The polymerization is then conducted at about −100° F., the solvent stripped off, the catalyst killed by water-washing, and the rubbery polymer recovered therefrom. This polymer having a viscosity average molecular weight of about 320,000 is dissolved in liquid ethyl chloride to form a 20% solution containing 100 parts by weight of copolymer. The copolymer is then admixed with 2.5 parts by weight of chlorine dissolved in liquid ethyl chloride and stirred for 2 hours under conditions of diffused light while keeping the ethyl chloride in the liquid state. The unreacted chlorine is neutralized with a 20% water solution of sodium carbonate. The rubbery chlorinated copolymer is recovered by filtration, contains 1.25% by weight of chlorine and has a viscosity average molecular weight of about 320,000.

Upon oxidation in the presence of boric acid as in Example 1, analysis of the oxidized chlorinated polymer reveals the presence of hydroxyl groups therein. Viscosity change was not excessive.

*Example 6*

The first oxidation run of Example 1 is repeated except that natural rubber is used in lieu of butyl rubber. No oxidation catalyst is employed. Analysis of the oxidized product again reveals the introduction of hydroxyl groups into the oxidized polymer.

*Example 7*

The first oxidation run of Example 1 is repeated except that in lieu of butyl rubber a copolymer (GR-N) containing in combination about 75% butadiene-1,3 and 25% acrylonitrile is oxidized in the presence of the $H_3BO_3$. Analysis of the oxidized product reveals the introduction of hydroxyl groups into the oxidized polymer.

*Example 8*

The first oxidation run of Example 1 is repeated except that in lieu of butyl rubber a copolymer (GR-S) containing in combination about 75% butadiene-1,3 and about 25% styrene is oxidized in the presence of the $H_3BO_3$. Analysis of the oxidized product reveals the introduction of hydroxyl groups into the oxidized polymer.

*Example 9*

The first oxidation run of Example 1, i.e. in the presence of boric acid is repeated except that after the reaction mixture is cooled and filtered, methanol is added and the mixture heated with stirring to methanol reflux temperatures; e.g. 60° C. The resultant mixture is cooled and the precipitated modified butyl rubber is removed by filtration, etc.

It should be understood that the boric acid compound must be present in a readily reactive form. Thus, it may be present as a substance which is a liquid at the reaction conditions, a finely divided solid, or in solution. Fused boric acid compounds, e.g. fused boric oxide, are not satisfactory.

What is claimed is:

1. A process for introducing hydroxyl groups into a high molecular weight, unsaturated, rubbery polymer having a minimum mole percent unsaturation of about 0.5 and wherein a constituent monomer therein is a $C_4$ to $C_{10}$ conjugated diolefin hydrocarbon which comprises contacting a solution of said polymer in an inert solvent with a gas containing molecular oxygen at a temperature in the range of 100° to 250° C., said solution containing dispersed therein about 0.2 to 25 weight percent, based on said polymer, of a boric acid compound selected from the group consisting of boric acid and boron compounds capable of generating boric acid upon contact with water.

2. A process in accordance with claim 1 wherein said boric acid compound is $H_3BO_3$.

3. A process in accordance with claim 1 wherein said polymer is a copolymer containing as constituent monomers about 90 to 99.5 weight percent of a $C_4$ to $C_7$ isoolefin and about 10 to 0.5 weight percent of a $C_4$ to $C_{10}$ conjugated diolefin.

4. A process in accordance with claim 1 wherein said polymer is polyisoprene.

5. A process in accordance with claim 1 wherein said temperature is in the range of 150° to 185° C.

6. A process in accordance with claim 1 wherein said boric acid compound is employed in the range of 3 to 10 weight percent.

7. A process for introducing hydroxyl groups into a rubbery copolymer having a minimum mole percent unsaturation of about 0.5 and containing as constituent monomers therein a major proportion of a conjugated $C_4$ to $C_6$ diolefin and a minor proportion of a monoethylenically unsaturated compound copolymerizable therewith which comprises contacting a reaction mixture containing said copolymer and dispersed therein about 3 to 10 weight percent, based on said copolymer, of a boric acid compound with a gas containing molecular oxygen, said boric acid compound being selected from the group consisting of boric acid and boron compounds capable of generating boric acid upon contact with water.

8. A process in accordance with claim 7 wherein said diolefin is butadiene-1,3.

9. A process in accordance with claim 7 wherein said monoethylenically unsaturated compound is styrene.

10. A process in accordance with claim 7 wherein said monoethylenically unsaturated compound is acrylonitrile.

11. A process in accordance with claim 7 wherein said gas mixture is air.

12. A process for introducing hydroxyl groups into a copolymer containing as constituent monomers about 90 to 99.5 wt. percent of isobutylene and about 10 to 0.5 wt. percent of a $C_4$ to $C_6$ diolefin which comprises dissolving said copolymer in an inert solvent and contacting the resulting solution with a gas mixture containing molecular oxygen at a temperature in the range of about 150° to 185° C., said solution containing dispersed therein about 0.2 to 25 wt. percent of a boric acid compound selected from the group consisting of boric acid and boron compounds capable of generating boric acid upon contact with water and 0.1 to 10 wt. percent of an oxidation catalyst based on the weight of said copolymer.

13. A process in accordance with claim 12 wherein said diolefin is isoprene.

14. A process in accordance with claim 12 wherein said gas mixture is a mixture containing about 3 to 6 vol. percent oxygen and 97 to 94 vol. percent nitrogen.

15. A process in accordance with claim 12 wherein said inert solvent is a solvent selected from the group consisting of benzene, chlorobenzene, bromobenzene, 1,2-dichlorobenzene, 1,3-dichlorobenzene, 1,4-dichlorobenzene, 1,2-dibromobenzene, 1,3-dibromobenzene and 1,4-dibromobenzene.

16. A process for introducing hydroxyl groups into a chlorinated copolymer having as constituent monomers therein about 90 to 99.5 wt. percent of isobutylene and about 10 to 0.5 wt. percent of a $C_4$ to $C_6$ diolefin and containing about 0.5 to 2.5 wt. percent combined chlorine which comprises dissolving said copolymer in an inert solvent and contacting the resulting solution with molecular oxygen at a temperature in the range of 100° to 250° C., said solution containing dispersed therein about 3 to 10 wt. percent of a boric acid compound selected from the group consisting of boric acid and boron compounds capable of generating boric acid upon contact with water and about 0.5 to 2 wt. percent of an oxidation catalyst based on the weight of said copolymer.

17. A process for producing a hydroxylated butyl rubber which comprises dissolving a copolymer containing as constituent monomers about 90 to 99.5 wt. percent of a $C_4$ to $C_7$ isoolefin and about 10 to 0.5 wt. percent of a $C_4$ to $C_{10}$ diolefin in bromobenzene to form a solution containing about 5 to 20 wt. percent of said copolymer, dispersing in said solution about 3 to 10 weight percent $H_3BO_3$ and about 0.5 to 2.5 weight percent cobalt bromide based on the weight of said copolymer in said solution contacting said solution with air at a temperature in the range of 150° to 185° C. adding to the resulting oxidized solution an oxygenated hydrocarbon selected from the group consisting of methanol and acetone, and recovering the resulting hydroxylated butyl rubber.

18. A composition of matter comprising a rubbery copolymer containing as constituent monomers about 90 to 99.5 weight percent of a $C_4$ to $C_7$ isoolefin and about 10 to 0.5 weight percent of a $C_4$ to $C_{10}$ conjugated diolefin, said copolymer having a minimum mole percent unsaturation of about 0.5 and containing from 0.1 to 15 weight percent combined oxygen as hydroxyl groups and characterized further as having been produced by the process of claim 1.

19. A composition of matter according to claim 18 wherein the isoolefin is isobutylene and the diolefin is isoprene.

References Cited in the file of this patent

UNITED STATES PATENTS

| | | |
|---|---|---|
| 2,634,256 | Sparks | Apr. 7, 1953 |
| 2,731,454 | Edmonds | Jan. 17, 1956 |
| 2,838,478 | Hillyer | June 10, 1958 |